United States Patent [19]
Harwood

[11] Patent Number: 5,563,383
[45] Date of Patent: Oct. 8, 1996

[54] STAMP FORMED MUFFLER WITH INTEGRAL EVACUATION TUBE

[75] Inventor: Jon W. Harwood, Toledo, Ohio

[73] Assignee: Apparts Manufacturing Company, Toledo, Ohio

[21] Appl. No.: 399,501

[22] Filed: Mar. 7, 1995

[51] Int. Cl.⁶ ........................................................ F01N 7/18
[52] U.S. Cl. ............................ 181/282; 181/272; 181/276
[58] Field of Search .................................... 181/282, 272, 181/276

[56] References Cited

U.S. PATENT DOCUMENTS

| 2,717,049 | 9/1955 | Longford . |
| 2,818,131 | 12/1957 | Doughty . |
| 2,824,619 | 2/1958 | Bremer et al. . |
| 3,638,756 | 2/1972 | Thiele ..................... 181/282 |
| 3,831,377 | 8/1974 | Morin . |
| 4,249,375 | 2/1981 | Grundmann et al. . |
| 4,700,806 | 10/1987 | Harwood . |
| 4,736,817 | 4/1988 | Harwood . |
| 4,759,423 | 7/1988 | Harwood et al. . |
| 4,760,894 | 8/1988 | Harwood et al. . |
| 4,765,437 | 8/1988 | Harwood et al. . |
| 4,836,330 | 6/1989 | Harwood et al. . |
| 4,842,096 | 6/1989 | Fujitsubo . |
| 4,847,965 | 7/1989 | Harwood et al. . |
| 4,860,853 | 8/1989 | Moring, III . |
| 4,865,154 | 9/1989 | Hanson et al. ........... 181/282 |
| 4,894,987 | 1/1990 | Harwood et al. . |
| 4,901,815 | 2/1990 | Harwood et al. . |
| 4,901,816 | 2/1990 | Garey . |
| 4,905,791 | 3/1990 | Garey . |
| 4,909,348 | 3/1990 | Harwood et al. . |
| 4,928,372 | 5/1990 | Harwood et al. . |
| 4,941,545 | 7/1990 | Wilcox et al. ........................... 181/282 |
| 5,004,069 | 4/1991 | Van Blaircum et al. . |
| 5,042,125 | 8/1991 | Harwood et al. . |
| 5,164,551 | 11/1992 | Harwood et al. . |
| 5,173,577 | 12/1992 | Clegg et al. . |
| 5,252,788 | 10/1993 | Emrick et al. . |

FOREIGN PATENT DOCUMENTS 2134979 8/1984 United Kingdom .

Primary Examiner—Khanh Dang
Attorney, Agent, or Firm—Anthony J. Casella; Gerald E. Hespos

[57] ABSTRACT

A muffler is provided for attenuating noise associated with flowing exhaust gas and for evacuating condensate from gravitational low points of the muffler. The muffler includes top and bottom plates that are formed to define a plurality of flow tubes therebetween. A bottom internal shell is secured to the bottom plate. The bottom plate and the bottom internal shell are formed respectively to define a siphon tube therebetween. The siphon tube includes a siphon inlet at a location that will coincide with a low point on the muffler and a siphon outlet in a selected flow tube. The muffler further includes a bottom external shell secured to the bottom internal plate and surrounding the bottom internal shell. Condensate accumulating of the gravitational low point of the bottom external shell will be drawn through the siphon tube and evacuated from the muffler.

15 Claims, 4 Drawing Sheets

STAMP FORMED MUFFLER WITH INTEGRAL EVACUATION TUBE

BACKGROUND OF THE INVENTION

1. Field of the Invention

The invention relates to a stamp formed muffler with a siphon tube for evacuating moisture from chambers of the muffler.

2. Description of the Prior Art

The prior art exhaust system of a vehicle includes a muffler to attenuate the noise associated with the flowing exhaust gas. Exhaust gases produced by an engine include vaporized liquids. These vapors in the exhaust gas condense as the gas cools. Some such condensation occurs in the muffler while the vehicle is operating due to the cooling that occurs as the exhaust gas travels further distances from the engine. Additionally, vapor in the muffler condenses when the engine is turned off. Condensate in a muffler will flow to the gravitational low point of the muffler or to the gravitational low point of each chamber in the muffler. This condensate can accumulate at these low points and can lead to an accelerated corrosion or rusting of the outer shell or the baffles of the prior art muffler.

Corrosion caused by condensate in a muffler often is avoided by merely placing a hole through the outer shell approximately at the gravitational low point of each chamber. The holes are intended to permit gravitational outflow of condensate before damage to the muffler occurs. Holes generally work well. However many new car manufacturers prefer not to provide new equipment with a hole. Furthermore, there is a concern that moisture passing through the hole will wick into the space between the outer shell and the outer wrapper. This moisture may not drain well and can accelerate corrosion. There also is a concern that particulates in the exhaust gas will combine with the condensate to form a sludge that may block the hole and render the hole inoperative.

Some prior art mufflers have been provided with a porous material that is intended to absorb moisture vapor before the vapor can condense.

Other prior art mufflers have included siphon tubes. Siphon tubes have been employed by drilling or punching an aperture through a flow tube of a prior art muffler. A diametrically smaller siphon tube is then mitered and welded to the flow tube at the aperture and extends down into a chamber of the muffler generally near a gravitational low point. A pressure differential between the chamber and the flow tube draws moisture condensate from the gravitational low point through the small diameter siphon tube and into the flow tube of the prior art muffler.

An example of a muffler with a siphon tube is shown in published British Patent Appl. GB 2 134 979 A.

Siphon tubes can be effective for evacuating condensate from the chamber into which the siphon tube extends. However, most prior art mufflers include a plurality of chambers separated by baffles. These prior art mufflers have included apertures at the gravitational low point of the baffle to permit fluid to flow gravitationally downwardly into the chamber having the siphon tube. Although prior art mufflers of this type have worked well, it is often desirable to have adjacent chambers structurally and functionally separate from one another. Thus, apertures in baffles may compromise the performance of one or both chambers separated by the baffle.

Mufflers assembled from formed components have received considerable commercial interest in recent years. The typical prior art formed muffler includes a pair of plates formed with channels. The plates are secured in face-to-face relationship such that the channels define flow tubes for carrying exhaust gas. The prior art formed mufflers further include a pair of external shells that are formed to define chambers surrounding the tubes. Each external shell may include an inwardly formed crease that engages the adjacent plate and defines a baffle that effectively divides the external shell into a plurality of structurally and functionally separate chambers. Formed mufflers are shown for example, in reissued U.S. Pat. No. RE 33,370, U.S. Pat. No. 4,765,437 and U.S. Pat. No. 5,252,788 all of which are assigned to the assignee of the subject invention.

Formed mufflers are subject to the condensate accumulation that affects conventional mufflers. As a result there is a desire to prevent the accumulation of condensate in formed mufflers. Condensate can effectively be eliminated by apertures through the external shell at the gravitational low point of each chamber. However, as noted above, new car manufacturers often will not allow apertures through their mufflers. Additionally, stamp formed mufflers often are provided with laminated shells, and apertures create the potential for a wicking of moisture into the space between the laminated shells. The mitering and welding of tubes required to incorporate siphons into conventional mufflers is not well suited to the automated manufacturing and assembly techniques used for formed mufflers. Thus the prior art siphon tube technology would offset many of the manufacturing efficiencies provided with stamp formed mufflers. Additionally, the inwardly formed baffle creases of prior art stamp formed mufflers are not well suited to apertures that would permit a gravitational down flow of condensate into the gravitationally lowest chamber for evacuation by a siphon tube. Separate siphon tubes to each chamber of a stamp formed muffler would be costly and would further complicate manufacturing.

In view of the above, it is an object of the subject invention to provide a stamp formed muffler with a siphon tube for evacuating moisture from at least one chamber.

It is another object of the subject invention to provide a muffler with plural formed components and with a siphon for evacuating condensate from a plurality of chambers.

SUMMARY OF THE INVENTION

The subject invention is directed to a muffler assembled substantially from formed sheet metal components. The muffler includes top and bottom internal plates that are formed to define a plurality of channels. The top and bottom internal plates are secured in face-to-face relationship with one another such that the channels define a plurality of gas passages or flow tubes. The flow tubes include at least one inlet to the muffler and at least one outlet from the muffler. Selected portions of the flow tubes include apertures which permit controlled expansion of exhaust gas into surrounding chambers of the muffler. One flow tube includes a siphon tube outlet opening through the bottom internal plate.

The muffler further includes a bottom internal shell that is secured to the bottom internal plate. The bottom internal shell and the bottom internal plate are formed to define a siphon tube therebetween. The siphon tube extends from a gravitational low point on the muffler to the siphon tube outlet opening in the bottom internal plate. The bottom internal shell further includes at least one siphon tube inlet opening substantially at the gravitational low point of the muffler.

The muffler of the subject invention also includes a bottom external shell secured to the bottom internal plate. The bottom external shell is formed to surround the channels in the bottom internal plate and to substantially abut the formed siphon tube at the gravitational low point on the muffler.

As explained and illustrated further below, the siphon tube may be external of but adjacent one flow tube of the muffler. Thus, the siphon tube and the adjacent flow tube share a common wall. At a selected location the common wall between the siphon tube and the flow tube is formed with the siphon tube outlet opening for permitting communication therebetween. This siphon tube outlet opening preferably defines the downstream end of the siphon tube and may be near the outlet of the muffler. Portions of the siphon tube adjacent the bottom external chamber will communicate with condensed moisture at the gravitational low point of the muffler. Pressure differentials between chambers defined by the bottom external shell and the flow tube will cause moisture to be drawn through the siphon tube, into the flowing exhaust stream and out of the muffler.

DETAILED DESCRIPTION OF THE PREFERRED EMBODIMENTS

Figure 1:
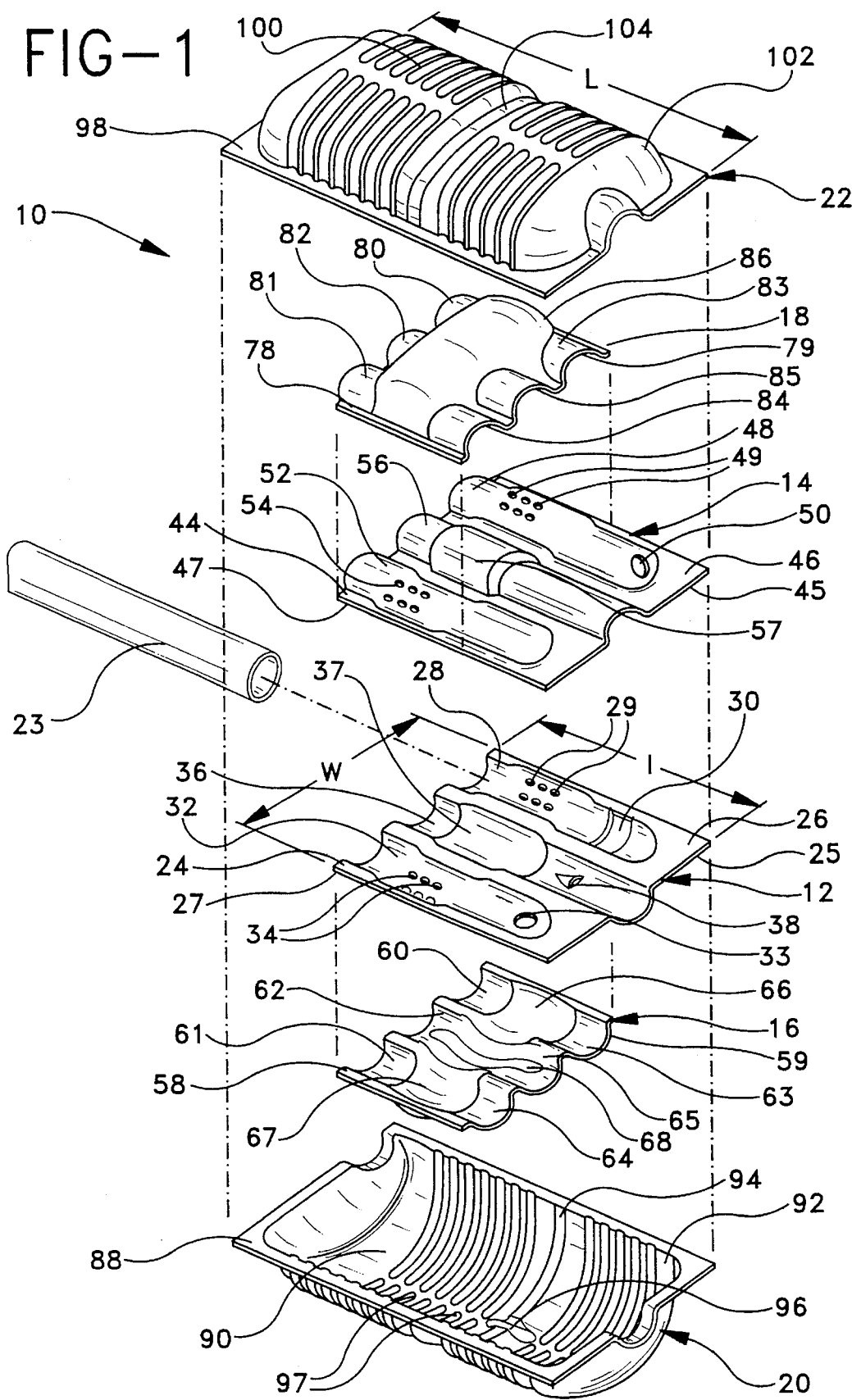
FIG. 1 is an exploded perspective view of a muffler in accordance with the subject invention.
Figure 2:
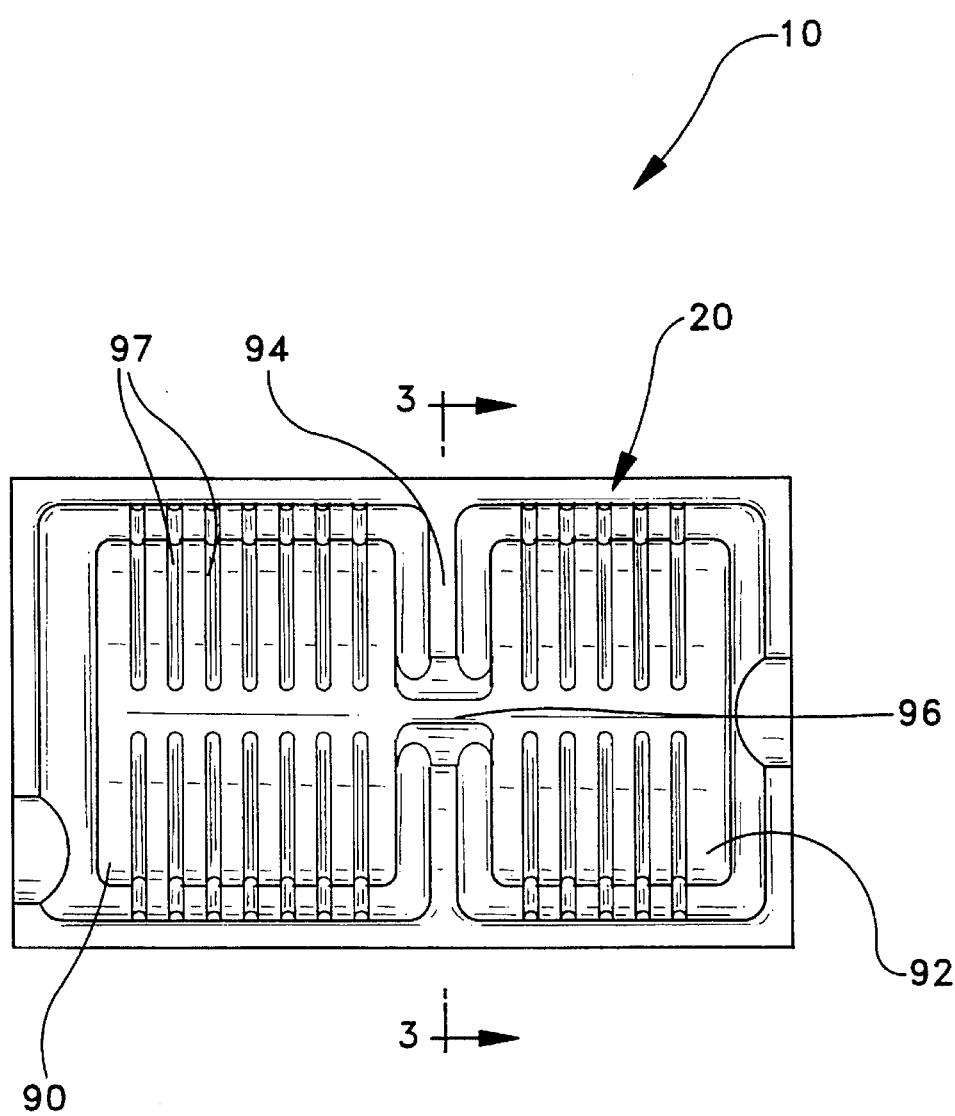
FIG. 2 is a bottom plan view of the muffler shown in FIG. 1.
Figure 3:
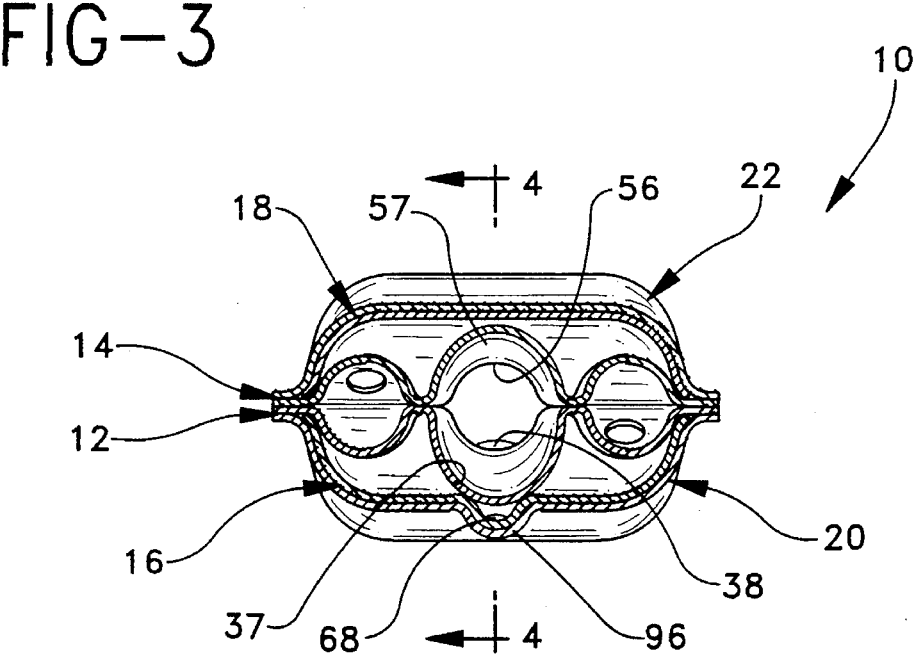
FIG. 3 is a cross-sectional view taken along line 3—3 in FIG. 2.
Figure 4:
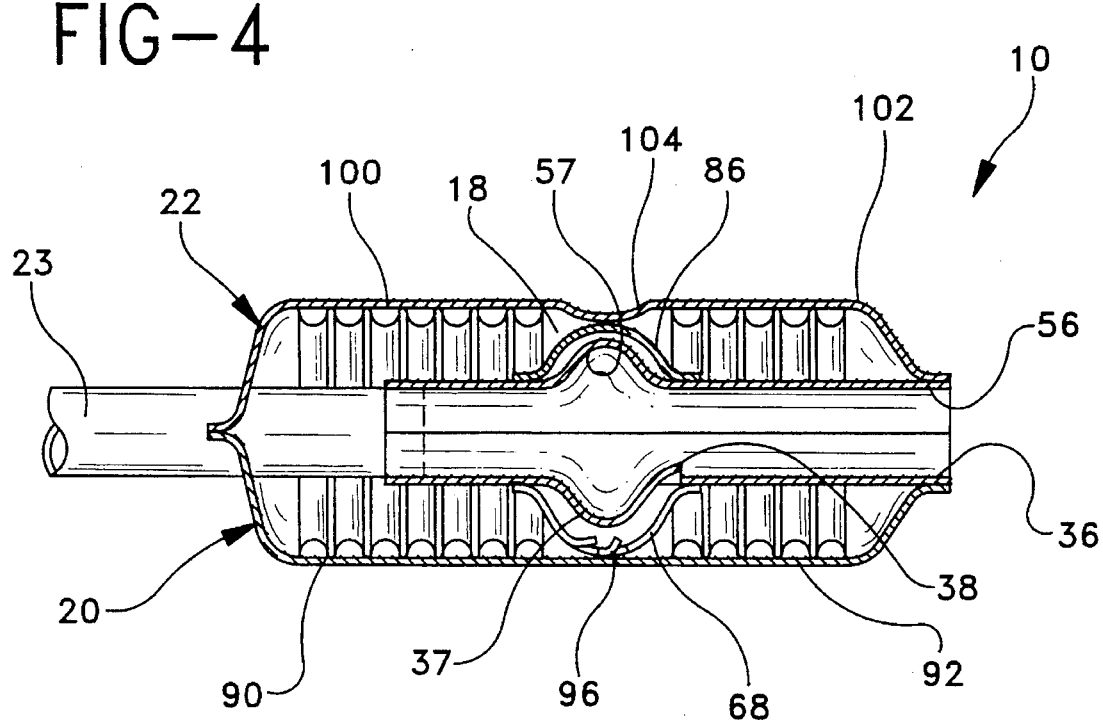
FIG. 4 is a cross-sectional view taken along line 4—4 in FIG. 2.
Figure 5:
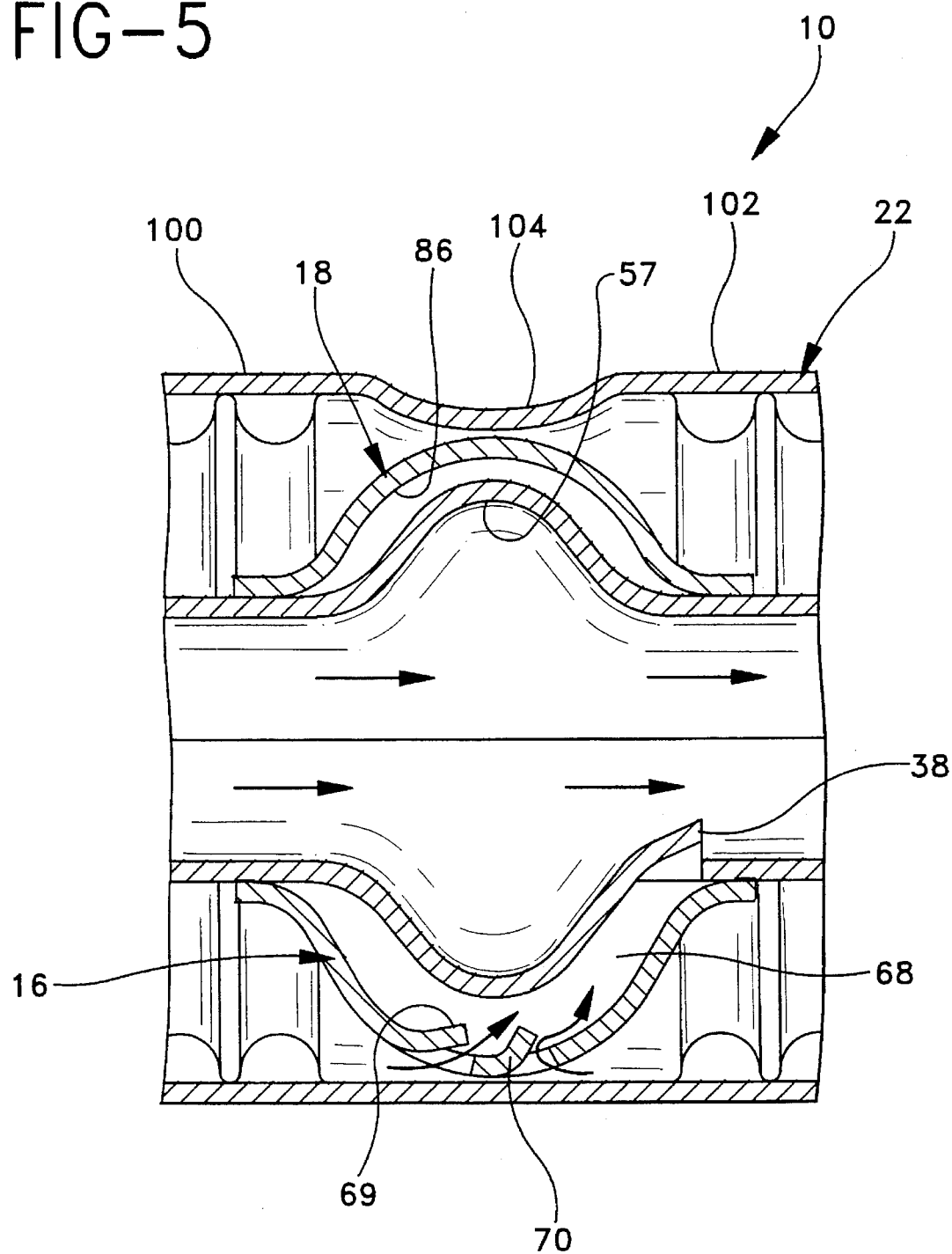
FIG. 5 is a cross-sectional view similar to FIG. 4, but showing only portions of the muffler with the siphon tube and outlet tube.

A muffler in accordance with the subject invention is identified generally by the numeral 10 in FIG. 1. The muffler 10 is made entirely with formed sheet metal components and includes bottom and top internal plates 12 and 14, bottom and top internal shells 16 and 18, bottom and top external shells 20 and 22 respectively and an inlet nipple or exhaust pipe 23.

The bottom internal plate 12 is generally rectangular and includes opposed upstream and downstream ends 24 and 25 and opposed sides 26 and 27. The ends 24 and 25 define a length "l" which is less than the overall length "L" of the muffler. The sides 26 and 27 of the bottom internal plate 12, however, define a width "W" which substantially defines the overall width of the muffler. The bottom internal plate 12 includes an inlet channel 28 which extends from the upstream end 24 toward the downstream end 25. As depicted in this embodiment, the inlet tube 28 is bowed slightly outwardly toward the side 26 to accommodate formed structure centrally on the bottom internal plate 12 as explained further below. The inlet channel 28 is characterized by an array of perforations 29 disposed on the outwardly bowed portions of the inlet channel 28. The inlet channel 28 also has a cut-out 30 near the downstream end 25.

The bottom internal plate 12 further includes a return channel 32 which extends from a location near the downstream end 25 to the upstream end 24. The return channel 32 includes an intermediate portion which is bowed toward the side 27 and substantially symmetrically with the outwardly bowed portion of the inlet channel 28. The return channel 32 is characterized by a cutout 33 near the downstream end 25 and a plurality of perforations 34 in the outwardly bowed portion of the return channel 32.

The bottom internal plate 12 also includes an outlet channel 36 extending from the upstream end 24 to the downstream end 25 of the bottom internal plate 12. The outlet channel 36 is characterized by a portion 37 of greater width and depth than remaining portions of the channels 28, 32 and 36. In this regard, the greater width is provided primarily to achieve a greater depth without excessive stretching of metal. Furthermore, the outwardly bowed portions of the inlet channel 28 and the return channel 32 are provided to accommodate this wider section of the outlet channel 36. The outlet channel 36 is not provided with perforations as in the other channels of the bottom internal plate 12. However, a small slit is formed centrally in the outlet channel 36, and the metal of the outlet channel 36 is deformed adjacent the slit to define a siphon tube outlet louver 38 facing the downstream end 25.

The top internal plate 14 includes opposed upstream and downstream ends 44 and 45 and opposed sides 46 and 47 to define a length and a width substantially identical to the corresponding dimensions on the bottom internal plate 12. The top internal plate 14 includes an inlet channel 48 configured to register with the inlet channel 28 of the bottom internal plate 12. The inlet channel 48 of the top internal plate 14 includes perforations 49 in the outwardly bowed portion and a cut-out 50 at the downstream end 45.

The top internal plate 14 further includes a return channel 52 extending from a location near the downstream end 45 entirely to the upstream end 44. The return channel 52 is configured to register with the return channel 32 of the bottom internal plate 12. The return channel 52 has no aperture comparable to the aperture 33 in the bottom internal plate 12, but is provided with an array of perforations 54 in the outwardly bowed portion of the return channel 52.

An outlet channel 56 extends from the upstream end 44 entirely to the downstream end 45. The outlet channel 56 is configured to register with the outlet channel 36, and hence includes a portion of greater width 57. However, this greater width portion need not be as deep as the registered portion 37 in the bottom internal plate 12. The outlet channel 56 of the top internal plate 14 does not have a siphon opening comparable to the siphon opening 38 in the bottom internal plate 12.

The bottom internal shell 16 includes opposed upstream and downstream ends 58 and 59 which define a length substantially less than the length "l" of the internal plates 12 and 14. The upstream and downstream ends 58 and 59 each are formed to define three channel mounting portions which are configured and dimensioned to closely nest with the channels formed in the bottom internal plate 12. More particularly, the upstream end 58 includes an upstream inlet mounting portion 60, an upstream return mounting portion 61 and upstream outlet mounting portion 62. The downstream end 59 of the bottom internal shell 16 is formed to define a downstream inlet mounting portion 63, a downstream return mounting portion 64 and a downstream outlet mounting portion 65. Portions of the internal shell 16 between the inlet mounting portions 60 and 63 are formed to define an inlet high frequency tuning chamber 66 dimensioned and configured to surround the perforations 29 in the inlet channel 28. Similarly, portions of the bottom internal shell 16 between the return mounting portions 61 and 64 are formed to define a return high frequency tuning chamber 67 which will surround the perforations 34 in the return channel 32.

The bottom internal shell 16 is formed to define a small groove 68 of substantially semi-circular cross-section between the outlet mounting portions 62 and 65. Portions of the bottom internal shell 16 on either side of the groove 68 are configured to closely engage the deeply drawn portion 37 of the outlet channel 36 in the bottom internal plate 12. Thus, the groove 68 and the deeply drawn portion 37 in the bottom internal plate 12 define a siphon tube therebetween. The groove 68 is further characterized by upstream and downstream siphon inlet louvers 69 and 70 respectively. As will be explained further herein, the siphon inlet louvers 69 and 70 permit an inflow of condensate to the siphon tube formed by groove 68 and the deeply drawn portion 37 of the bottom internal plate 12. The siphon inlet louvers 69 and 70 communicate with the outlet louver 38 in the outlet channel 36 as explained further below.

The top internal shell 18 has a size and configuration similar to the bottom internal shell 16. More particularly, the top internal shell 18 includes opposed upstream and downstream ends 78 and 79. The upstream end 78 includes channel mounting portions 80, 81 and 82 dimensioned and disposed to nest respectively with portions of the inlet channel 48, the return channel 52 and the outlet channel 56 formed in the top internal plate 14. Similarly, the downstream end 79 is characterized by channel mounting portions 83, 84 and 85 dimensioned and disposed to nest with downstream areas on the inlet channel 48, the return channel 52 and the outlet channel 56 of the top internal plate 14. The top internal shell 18 is configured to define an internal chamber 86 between the upstream and downstream ends 78 and 79. As depicted herein, the internal chamber 86 is configured to be in spaced relationship to all three channels in the top internal plate 14 for permitting cross-flow of exhaust gas between the inlet channel 48 and the return channel 52. However, in other embodiments, central portions of the internal chamber 86 may be configured to closely engage the outlet channel 56 so that two functionally separate chambers communicate with the inlet channel 46 and the return channel 52 respectively.

The bottom external shell 20 is formed to include a peripheral flange 88 an upstream external chamber 90, a downstream external chamber 92 and a connecting portion 94 therebetween. The connecting portion includes a central groove 96 configured to closely engage the siphon groove 68 in the bottom internal chamber 16. Areas of the connecting portion 94 on either side of the groove 96 are configured to closely engage the high frequency tuning chambers 66 and 67 of the bottom internal shell 16, and to thereby form a baffle separating the upstream external chamber 90 from the downstream external chamber 92. A plurality of intermittent reinforcing ribs 97 are formed in the bottom external shell 20 for minimizing shell vibration and associated ringing. The reinforcing ribs 97 are discontinuous for permitting a controlled flow of moisture toward the groove 96.

The top external shell 22 has a shape similar to the bottom external shell 20. More particularly, the top external shell 22 includes a peripheral flange 98 from which an upstream external chamber 100 and a downstream external chamber 102 extend. A connecting portion 104 is defined between the upstream and downstream external chambers 100 and 102 and is configured to closely engage the internal chamber 86. Thus, the engagement between the connecting portion 104 and the internal chamber 86 defines a baffle which separates the upstream and downstream external chambers 100 and 102.

The muffler 10 is assembled by initially securing the internal plates 12 and 14 to one another and by then securing the bottom and top internal shells 16 and 18 to the bottom and top internal plates 12 and 14 respectively. In this interconnected state, the high internal chamber 86 of the top internal shell 18 surrounds the perforations 49 and 54 in the inlet and return channels 48 and 52 respectively of the top internal plate 14. Additionally, the high frequency tuning chambers 66 and 67 of the bottom internal shell 16 surround the perforation arrays 29 and 34 in the inlet channel 28 and the return channel 32 of the bottom internal plate 12. However, there is no communication between the high frequency tuning chambers 66 and 67. Rather, the high frequency tuning chambers 66 and 67 are separated from one another by portions of the bottom internal shell 16 adjacent the siphon groove 68. The siphon groove 68 closely follows the enlarged portion 37 of the outlet channel 36 and extends into communication with the siphon outlet louver 38 in the outlet channel 36.

Assembly of the muffler 10 continues by securing the bottom and top external shells 20 and 22 around the interconnected internal plates 12 and 14 and the associated internal shells 16 and 18. More particularly, the downstream ends of the bottom and top external shells 20 and 22 are secured to substantially register with the downstream ends 25 and 45 of the bottom and top internal plates 12 and 14. However, the upstream ends of the bottom and top external shells 20 and 22 will be spaced in an upstream direction from the upstream ends 24 and 44 of the bottom and top internal plates 12 and 14. Thus, the upstream external chambers 90 and 100 are not completely divided by internal components of the muffler 10. In this interconnected state, the connecting portion 104 of the top external shell 22 closely engages and is secured to the internal chamber 86 of the internal shell 18 to define a baffle separating the upstream and downstream external chambers 100 and 102. Similarly, the connecting portion 94 of the bottom external shell 20 closely engages the bottom internal shell 16 to define a baffle. As part of this engagement, the siphon groove 96 in the connecting portion 94 of the bottom external shell 20 will surround the siphon groove 68 in the bottom internal shell 16. In this interconnected state, the upstream siphon inlet louver 69 is disposed within and communicates with the upstream external chamber 90. Additionally, the downstream siphon inlet louver 70 communicates with the downstream external chamber 96. The inlet nipple or exhaust pipe 23 can be inserted through formed inlet portions at the upstream end of the external shells 20 and 22 and into communication with the inlet channels 28 and 48. Alternatively, this connection of the inlet nipple or exhaust pipe 23 to the inlet channels 28 and 48 can be completed prior to attachment of the external shells 20 and 22.

Exhaust gas enters the muffler 10 through the inlet nipple 23 and flows into the inlet tube formed by inlet channels 28 and 48. Perforations 29 and 49 in the inlet channels 28 and 48 permit communication of exhaust gas to the high frequency tuning chambers formed by the internal shells 16 and 18. Exhaust gas will continue into downstream portions of the inlet channels 28 and 48. This exhaust gas will flow through the aperture 30 in the bottom internal plate 12 and into the downstream external chamber 92. Exhaust gas will flow from the downstream external chamber 92 through the aperture 33 and into the return tube formed by return channels 32 and 52. As noted above, the return channel 52 formed by the top internal plate 14 does not have an aperture near the downstream end. However, the inlet channel 48 in the top internal plate 14 does have an aperture. With this construction, the downstream external chamber 102 formed by the top external shell 22 functions as a low frequency resonating chamber.

Exhaust gas flowing through the return tube formed by the return channels 32 and 52 communicates with the high frequency tuning chamber formed by internal shells 16 and 18 via the perforations 34 and 54. The exhaust gas then continues toward the upstream ends 24 and 44 of the internal plates 12 and 14 and into the upstream external chambers 90 and 100. The expansion of exhaust gas entering the upstream and external chambers 90 and 100 performs a significant amount of the noise attenuation associated with the flowing exhaust gas. After this expansion the exhaust gas will enter the outlet tube formed by the channels 36 and 56 in the bottom and top internal plates 12 and 14. This flow of exhaust gas communicates directly with the siphon outlet louver 38. Pressure differentials between the siphon outlet louver 38 and the respective upstream and downstream bottom external chambers 90 and 92 cause a siphoning of exhaust gas from the bottom external chambers 90 and 92 and into the outlet tube formed by the channels 36 and 56.

While the invention has been described and illustrated with respect to a preferred embodiment, it is apparent that various changes can be made without departing from the scope of the invention as defined by the appended claims. For example, many other configurations of tubes, apertures, perforations and the like can be provided in the formed muffler. Additionally, in certain embodiments the internal plates can extend entirely the length of the muffler as in the other prior art stamp formed mufflers developed by the assignee of the subject invention and disclosed in the above referenced prior art. Additionally, the relative position of the formed siphon tubes can be moved to coincide with a gravitational low point of the muffler at a location other than the central portion thereof. These and other variations will be apparent to the person skilled in the art after having reviewed the subject disclosure.

We claim:

1. An exhaust muffler having an inlet and an outlet and being formed from:

top and bottom plates secured in face-to-face relationship and formed to define a plurality of flow tubes therebetween, said flow tubes providing communication between said inlet and said outlet of said muffler, said bottom plate being formed to include aperture means for permitting a controlled expansion and cross-flow of exhaust gas relative to said flow tubes;

a bottom external shell secured to said bottom plate and formed to define at least one bottom external chamber surrounding said aperture means in said bottom plate; and a bottom internal shell secured to said bottom plate, said bottom internal shell and said bottom plate being formed to define a siphon tube therebetween, said siphon tube having at least one siphon inlet substantially adjacent said bottom external shell and a siphon outlet communicating with one said flow tube, whereby pressure differentials between said bottom external chamber and said flow tubes cause condensate in said bottom external shell to be drawn through said siphon tube and evacuated from said muffler.

2. The muffler of claim 1, wherein said bottom internal shell is disposed intermediate said bottom internal plate and said bottom external shell.

3. The muffler of claim 2, wherein said bottom internal shell and said bottom external shell are formed to define a baffle dividing said bottom external shell into upstream and downstream bottom external chambers, said baffle being formed with a siphon passage for permitting flow of condensate from both said upstream and downstream bottom external chambers into said siphon tube.

4. The muffler of claim 3, wherein said siphon tube extends through said siphon passage in said baffle, said at least one siphon inlet comprising upstream and downstream siphon inlets disposed respectively in said upstream and downstream bottom external chambers.

5. The muffler of claim 1, wherein said flow tubes include an outlet tube communicating with said outlet of said muffler, said siphon outlet being in portions of said bottom plate defining said outlet tube.

6. The muffler of claim 1, wherein said bottom external shell includes at least one location defining a gravitational low point on said muffler, said siphon inlet being disposed at said gravitational low point.

7. The muffler of claim 1, wherein said bottom internal shell is disposed between said bottom plate and said bottom external shell, said bottom internal shell being further formed to define at least one bottom internal chamber surrounding portions of at least one of said flow tubes of said muffler, portions of said flow tube surrounded by, said bottom internal chamber having said aperture means therein for permitting exhaust gas communication with said bottom internal chamber.

8. The muffler of claim 1, wherein said siphon outlet is a louver opening toward said outlet of said muffler.

9. The muffler of claim 1, further comprising a top external shell secured to said top plate and formed to define at least one top external chamber surrounding portions of said flow tubes defined by said top plate.

10. The muffler of claim 9, further comprising a top internal shell secured to said top plate and disposed between said top plate and said top external shell, said top internal shell being formed to define at least one top internal chamber surrounding portions of at least one of said flow tubes, portions of said flow tube surrounded by said top internal chamber having said perforation means for permitting communication of exhaust gas with said top internal chamber.

11. The muffler of claim 10, wherein said top internal shell and said top external shell are formed to securely engage one another for dividing said at least one top external chamber into upstream and downstream top external chambers.

12. An exhaust muffler having an inlet and an outlet and comprising:

top and bottom internal plates secured in face-to-face relationship and formed to define a plurality of flow tubes therebetween, said flow tubes including an inlet tube communicating with said inlet of said muffler and an outlet tube communicating with said outlet of said muffler, said outlet tube having a siphon outlet formed through said bottom plate;

a top internal shell secured to said top internal plate and formed to define a top internal chamber surrounding selected portions of said flow tubes;

a bottom internal shell secured to said bottom internal plates and formed to define at least one bottom internal chamber surrounding selected portions of said flow tubes, said bottom internal shell and said bottom plate being formed respectively to define a siphon tube therebetween, said siphon tube communicating with said siphon outlet in said bottom plate and further including a siphon inlet spaced from said siphon outlet;

a top external shell secured to said top internal plate and to said top internal shell and being formed to define upstream and downstream top external chambers separated from one another by said top internal shell; and a bottom external shell secured to said bottom internal plate and said bottom internal shell and formed to define upstream and downstream bottom external chambers separated from one another by said bottom internal shell, said siphon inlet being disposed substantially adjacent said bottom external shell, whereby pressure differentials between said bottom external chambers and said outlet tube cause condensate in said bottom external shell to be drawn through said siphon tube and evacuated from said muffler.

13. The muffler of claim 12, wherein said bottom external shell and said bottom internal shell are formed respectively to permit communication of condensate from both said upstream and downstream bottom external chambers to said siphon tube.

14. The muffler of claim 13, wherein said siphon tube extends into both said upstream and downstream bottom external chambers, said siphon tube being formed to include both upstream and downstream siphon inlets for communicating respectively with said upstream and downstream bottom external chambers.

15. The muffler of claim 12, wherein said top and bottom plates are spaced from said inlet to said muffler, said muffler further including a pipe extending from a location external of said muffler into said top and bottom upstream external chambers for communication with said inlet tube formed by said top and bottom plates.

\* \* \* \* \*

UNITED STATES PATENT AND TRADEMARK OFFICE
CERTIFICATE OF CORRECTION

PATENT NO. : 5,563,383

DATED : October 8, 1996

INVENTOR(S) : Jon W. Harwood

It is certified that error appears in the above—identified patent and that said Letters Patent is hereby corrected as shown below:

Title page, item [73],

After "Assignee:", delete "Apparts" and insert "AP Parts"

Signed and Sealed this

Twenty-sixth Day of August, 1997

Attest:

BRUCE LEHMAN

Attesting Officer

Commissioner of Patents and Trademarks